United States Patent [11] 3,593,337

| [72] | Inventor | Victor D. Ellison |
| | | Waverly, Pa. |
| [21] | Appl. No. | 754,896 |
| [22] | Filed | Aug. 23, 1968 |
| [45] | Patented | July 13, 1971 |
| [73] | Assignee | The Bendix Corporation |

[54] ELECTROMECHANICAL TRANSDUCER
13 Claims, 9 Drawing Figs.
[52] U.S. Cl. .................................... 340/187,
340/198, 340/199
[51] Int. Cl. ................................. G08c 19/08
[50] Field of Search ......................... 340/199,
196, 198, 187, 20

[56] References Cited
UNITED STATES PATENTS
2,496,105  1/1950  Pearson .......................... 340/198
2,855,551  10/1958  McCarty ....................... 340/187
2,881,375  4/1959  Kennedy ....................... 340/187
3,079,548  2/1963  Robinson ...................... 340/198
3,108,213  10/1963  Golder .......................... 340/187

Primary Examiner—Thomas B. Habecker
Attorneys—Dale A. Bauer, John L. Seymour, Bauer and Seymour and Plante, Arens, Hartz and O'Brien ABSTRACT: A motion detecting device for sensing the direction and magnitude of such motion in the form of a sealed electromechanical transducer including a highly sensitive synchro having a rotor comprising magnetic flux conducting material and a rotatably stator with a plurality of series connected primary windings energized by an AC source of electrical energy and servoed in response to the electrical output thereof, as determined by the rotor position, to follow movements of the rotor relative to the stator and thereby reestablish a null or zero output relationship of the stator and the rotor, said output being a result of variations in the impedance of the windings when the rotor is displaced from a predetermined null or zero output position relative to the stator.

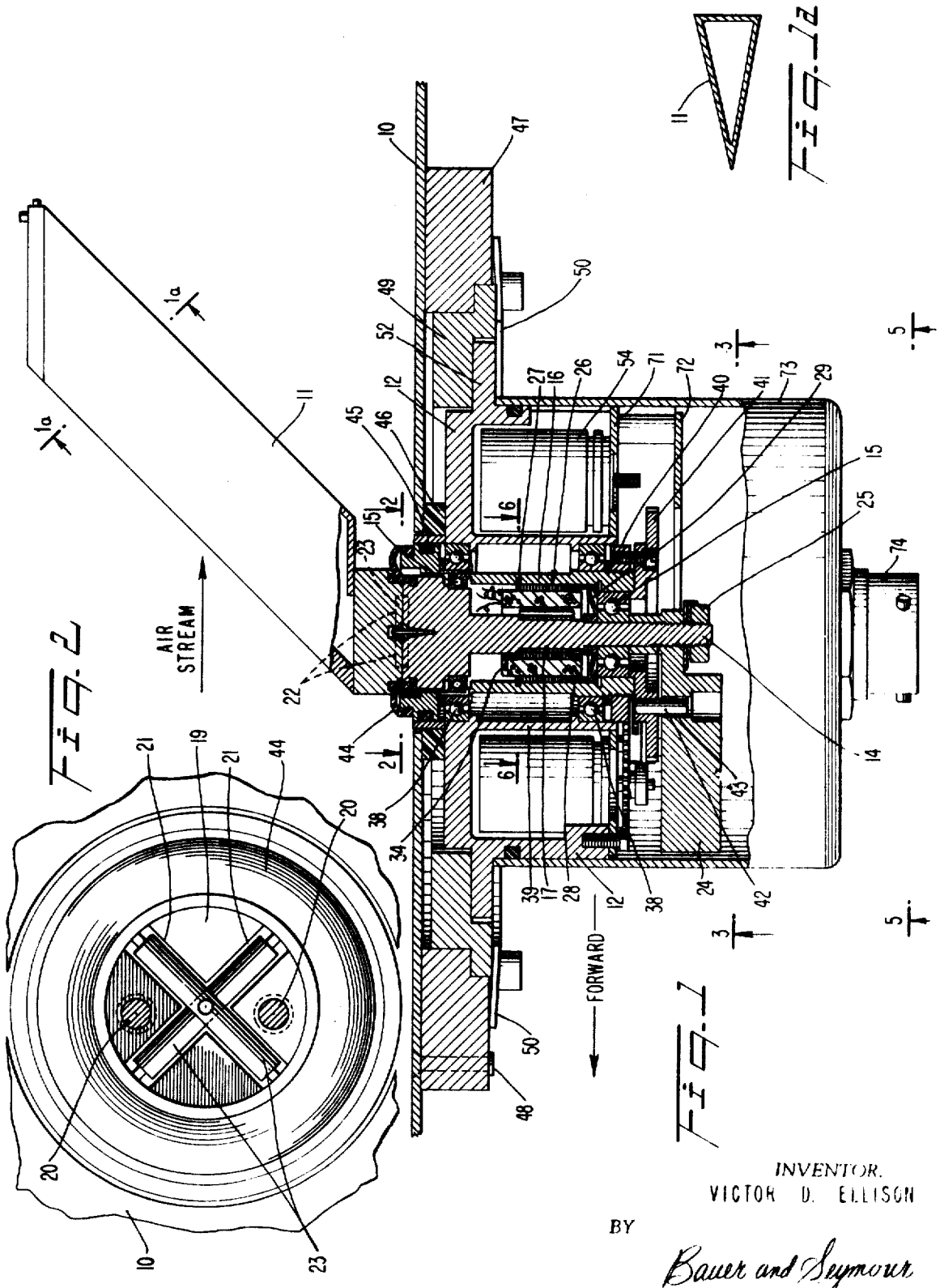

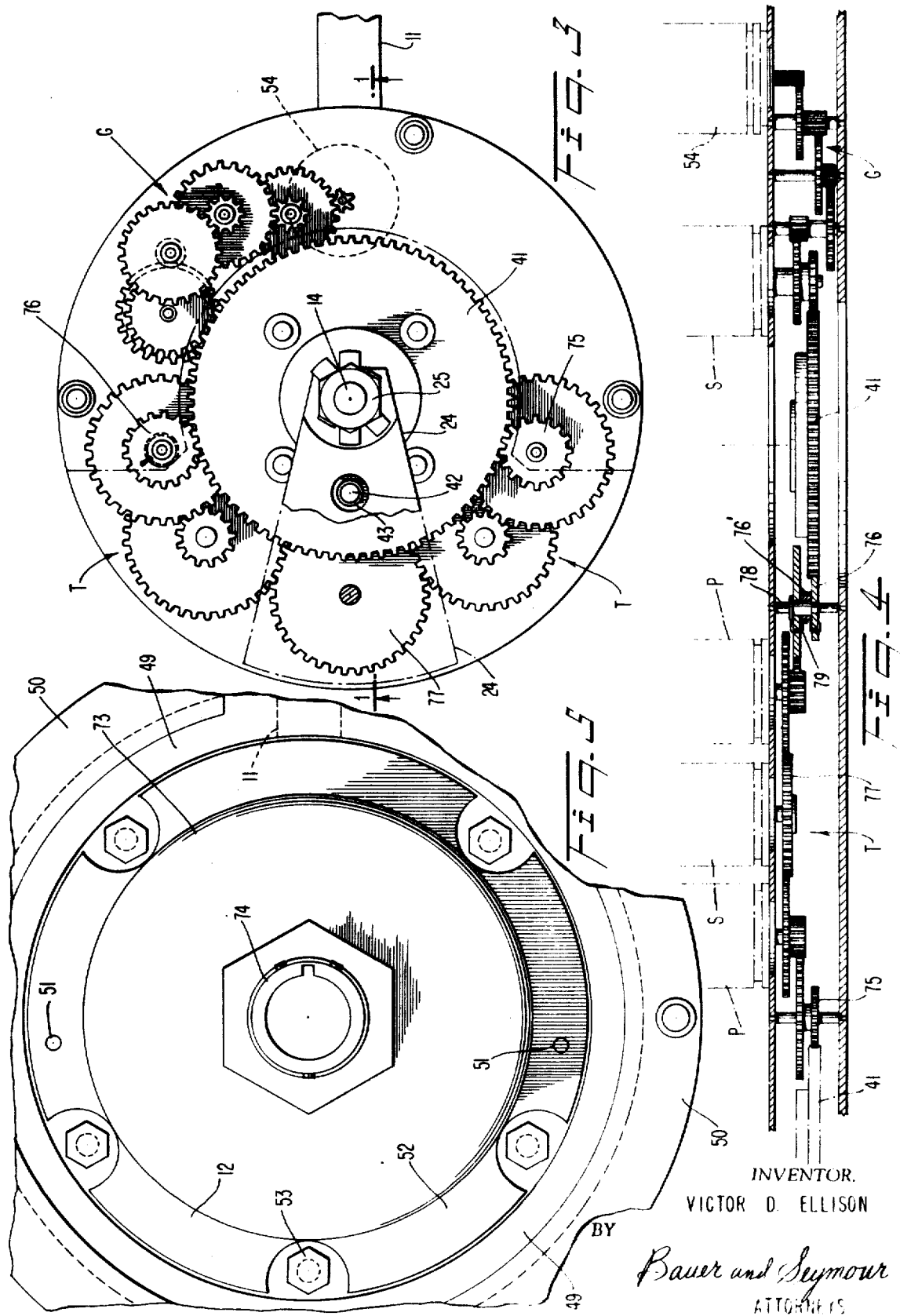

PATENTED JUL 13 1971

INVENTOR.
VICTOR D. ELLISON
BY
Bauer and Seymour
ATTORNEYS

ELECTROMECHANICAL TRANSDUCER

This invention relates to motion detecting apparatus and more particularly to transducer means for converting mechanical motion to electrical energy and reconverting the latter to corresponding mechanical motion.

One of the objects of the present invention is to provide novel means for generating an electrical output or signal in response to mechanical motion and further to provide means for converting said electrical output to a corresponding followup mechanical motion.

Another object of the invention is to provide a novel simplified electromechanical transducing system.

Still another object is to provide apparatus of the above character comprising novel gearing for transmitting motion from a single source to a plurality of devices, whereby error due to mechanical backlash of the gearing is minimized.

A further object is to provide a novelly constructed, highly sensitive apparatus for sensing the magnitude and direction of angular mechanical motions.

A still further object is to provide a novel electromechanical sensor comprising a novelly constructed rotor-stator combination.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a top plan view, partly in section of an apparatus embodying one form of the invention mounted on an aircraft fuselage for measuring the angle of attack thereof, the section being taken substantially on line 1-1 of FIG. 3;

FIG. 1a is a detailed sectional view taken on line 1a-1a of FIG. 1;

FIG. 2 is a detail view on an enlarged scale taken substantially on line 2-2 of FIG. 1 with the wind vane removed;

FIG. 3 is an elevation view, with parts broken away and with the cover removed, taken substantially on line 3-3 of FIG. 1;

FIG. 4 is a stretchout view of the gear trains embodied in the apparatus of FIG. 1 and seen in elevation in FIG. 3;

FIG. 5 is an elevation view, with parts broken away, of the apparatus as viewed from line 5-5 of FIG. 1;

Figure 6:
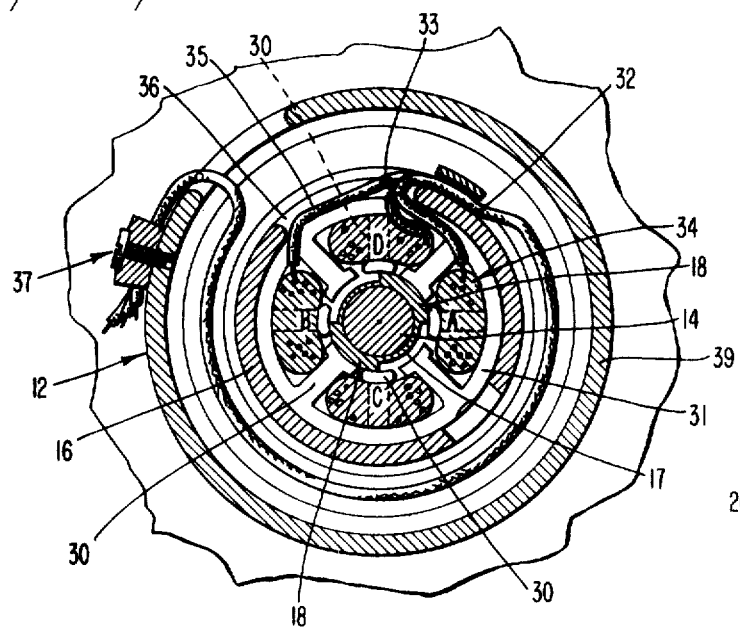
FIG. 6 is a enlarged scale transverse sectional view, with parts broken away, taken substantially on line 6-6 of FIG. 1 and showing the motion sensing synchro rotor and stator in a null or zero output relation.

The single embodiment of the invention illustrated in the drawings, by way of example, is in a form adapted for use in measuring and indicating the angle of attack of an aircraft in flight. This is only one of many uses for which the invention is adapted. As shown, the instrument is mounted on a normally vertical sidewall 10 of an aircraft fuselage with the major portion thereof inside the craft and only a wind vane 11 extending laterally into the airstream through an opening in said sidewall.

Novel means are contemplated by the invention for sensing angular movement of the vane 11 in either direction with respect to a predetermined plane of reference fixed in relation to the longitudinal axis of the aircraft and for converting such movement into an electrical error signal which is in turn converted into a corresponding or followup mechanical movement to restore the sensing means to a null or zero output condition. In the form illustrated, the sensing device is a synchro comprising a novel rotor assembly rotatably mounted within a novel stator assembly which is in turn rotatably mounted in a frame or casing 12 secured to the inner surface of wall 10 of the aircraft by means to be hereinafter more fully described.

Figure 8:
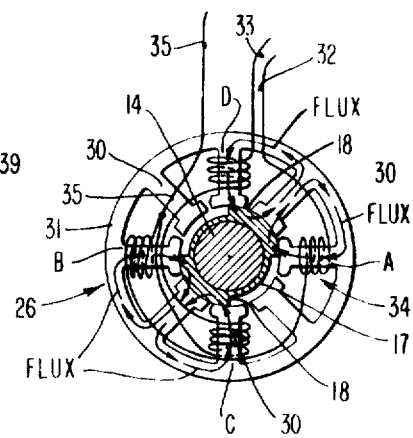
FIG. 8 is a schematic diagram similar to FIG. 6 showing the magnetic flux generated at a given instant when the stator windings are energized.

The rotor assembly which is positioned by the vane 11 in response to the airstream comprises a shaft 14 of nonmagnetic material rotatably supported by frictionless bearings 15 in an outer tubular drum or shaft 16. A sleeve 17 of magnetic material forming a single conductive turn about shaft 14 is cemented or otherwise suitably secured to the central portion of said shaft. The outer peripheral surface of sleeve 17 is contoured by varying the radial thickness to provide two diametrically disposed arcuate poles 18 (FIGS. 6 and 8). At its outer end shaft 14 has an enlarged hub portion 19 to which wind vane 11 is removably secured, such as by bolts 20.

Shaft 14 and vane 11 are preferably accurately angularly indexed relative to each other by means of crossed V-grooves 21 and 22 in adjacent surfaces of the hub portions thereof and crossed cylindrical dowels 23 seated in said grooves to thereby locate the hub portions positively with respect to each other. This insures complete interchangeability of vane assemblies. Vane 11 is preferably wedge-shaped as seen in FIG. 1a. A counterweight 24 is secured to the inner end of shaft 14 for rotation therewith by any suitable means, such as a nut 25 and a drive washer. Relative rotation of said shaft and weight may be prevented by a key and cooperating keyway. The counterweight is designed and mounted to balance vane 11 and minimize acceleration effects. Suitable stops (not shown) are preferably provided for limiting the angular movement of counterweight 24 and hence, of rotor 14, 17 to about 90° or less.

Hollow shaft 16 supports and may be regarded as a part of the stator assembly 26 of the sensing device which comprises an annular multipole laminated core surrounding rotor sleeve 17. Said core is axially positioned in drum 16 by a split ring 27, a spacer 28 and a wavy spring washer 29 disposed between said spacer and bearing 15. In the form shown, by way of example, the core of stator 26 has eight equally spaced poles 30 which extend radially inwardly from a ring 31 and have arcuate shoe portions concentric with and closely adjacent to the surfaces of rotor poles 18. A core winding 34 consists, in the form shown, of four equal coils A, B, C, and D which are wound on four equally spaced stator poles 30 and are series connected across a source of electrical energy, such as transformer secondary 55, by the leads 32 and 33 in the manner illustrated in FIGS. 6 to 8. A third lead 35 is connected to a center tap of primary winding 34 at the junction of coils B and C. Said leads are brought out of drum 16 through an opening 36 and are preferably anchored at 37 to casing portion 39 with sufficient slack to permit the desired angular movement of said drum relative to said casing portion.

The stator assembly including hollow shaft 16 is rotatably supported by frictionless bearings 38 in a centrally disposed hollow cylindrical boss or flange 39 in casing 12. The shaft 16 is secured in position by an internally threaded ring 40 on the inner end of said shaft and suitably positioned flanges or shoulders on the shaft and in the casing portion 39 that cooperate with bearings 38.

A gear 41 is piloted in the inner end of drum shaft 16 and is secured by several bolts to ring 40 for rotation with said shaft and hence, with the stator assembly 26. A pin 42 is eccentrically mounted on gear 41 and extends into a slightly larger eccentric recess or opening 43 in counterweight 24. The clearance between pin 42 and the wall of opening 43 is preferably only sufficient to allow a few degrees, say about 3°, of angular movement of the rotor assembly relative to the stator assembly to which counterweight 24 and gear 41 are respectively connected. The relative movement thus permitted by pin 42 may be made adjustable, such as by providing threaded stops at opposite sides of the pin.

Casing 12 and shafts 14 and 16 have concentric portions exposed to the exterior of the aircraft through an opening in wall 10, and means are provided for sealing the annular clearance spaces therebetween against the entrance of air, dirt, moisture and the like, while permitting sufficient relative angular movement thereof. In order to seal the annular spaces between the outer exposed ends of shaft 14 and shaft 16, without appreciably restricting or opposing small relative angular movements thereof, a readily flexible elastomeric torsional seal 44 is provided. Said seal consists of an impervious ring of polysiloxane or the like having its inner and outer peripheral margins cemented to shafts 14 and 16 as illustrated in FIG. 1. A cylindrical portion of the sealing ring may also extend across the junction of the hub portions of vane 11 and shaft 14. The limited relative angular movement of shafts 14 and 16 permitted by pin 42 and opening 43 avoids any overstressing of seal 44. The space between outer shaft 16 and casing 12 is sealed in a conventional way by an O-ring 45, and the space between casing 12 and wall 10 is also sealed in a conventional manner by a gasket 46.

The casing 12 and hence, the rotor and stator assemblies rotatably mounted therein, are adjustably mounted on wall or skin 10 of the aircraft by means including an apertured mounting plate 47 secured, as by rivets 48, to the wall. A mounting ring 49 is piloted and secured by clamps 50 in plate 47 for angular adjustment. Ring 49 carries a pair of dowel pins 51 (FIG. 5) which are adjusted by angular positioning of the ring to a predetermined zero position or level before tightening clamps 50. The mounting flange 52 of casing 12 is oriented by dowels 51 and secured to ring 49 by a plurality of bolts 53. The sensing device will then assume a null or zero output position under the influence of the airstream on vane 11 when the aircraft is travelling at zero or other preselected reference angle of attack. Any change in that angle during flight will then be measured by an equal relative angular movement of the rotor and stator assemblies.

Figure 7:
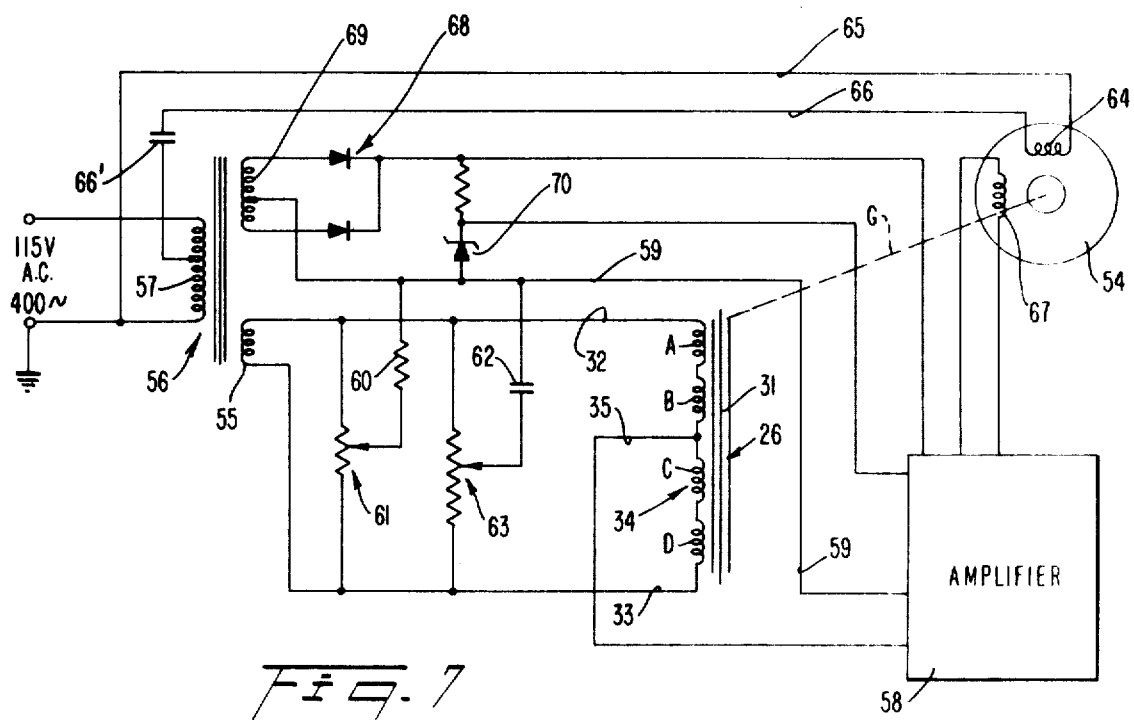
FIG. 7 is a schematic wiring diagram of the electrical system embodied in said apparatus.

By means of the above-described sensing device and novel circuitry, including coils A to D, contemplated by the invention, angular movements of the rotor relative to the stator away from the predetermined null position are converted to electrical output or error signals by said coils, which outputs are utilized to energize a servomotor 54 which drives the stator assembly so as to cause it to follow the rotor and restore the null or zero output relationship thereof. As shown in FIG. 7, the sensing device may be energized by the secondary winding 55 of a stepdown transformer 56 having a primary winding 57 connected across a suitable AC source of electrical energy. The coils A to D are connected in series across secondary winding 55 through leads 32 and 33. The center tap of the sensor windings is connected by an output lead 35 to an input stage terminal of an amplifier 58. A return lead 59 is connected to secondary winding 55 via parallel paths. One of said paths comprises a resistor 60 and a resistance voltage divider 61 connected across winding 55, and the other path comprises a capacitor 62 and a second resistance voltage divider 63 also connected across winding 55. The voltage divider taps are thus in effect adjustable center taps for supply winding 55.

The primary coils A to D are so wound on the stator poles 30 that for a given polarity of current flow through these series-connected coils, the generated magnetic flux will be in the direction and along the paths indicated in FIG. 8. When the rotor poles 18 are in their null position, i.e., when each is centered with respect to a pair of stator poles on which the coils are wound, as shown in FIGS. 6 and 8, the several flux paths will offer equal reluctance to magnetic flux generated by each of the coils, and the impedances of the latter will then be equal, and the voltages at the voltage divider taps and center tap 35 will be equal. Hence, there will not be any resultant flow or output of energy from center tap 35 through the amplifier 58. In the event of any electrical unbalance in the system resulting in current flow to the amplifier when rotor 17, 18 is in its null position, such as may be due to manufacturing tolerances or other reasons, the resistive and reactive components of the two halves of the electrical system of the sensing device may be brought into balance by adjustment of the taps to voltage dividers 61 and 63, respectively. It is possible, but somewhat difficult in mass production, to accurately balance the described sensing circuitry without incorporating the adjustable voltage dividers, resistance 60 and capacitor 62. In this event, the return lead 59 would be connected to the center of secondary winding 55.

The relationship of rotor poles 18 and stator poles 30 is preferably such that a pole 18 extends from about the center of one pole 30 on which a coil is wound to the center of an adjacent pole 30 on which a coil is wound. Thus, movement of the rotor will increase the interface of the rotor and one said pole 30 while reducing the interface of the rotor and the other of said poles 30. Whenever rotor 17, 18 is angularly displaced from its central or null position, the impedances of coil pairs A–B and C–D become unbalanced as a result of the unbalanced flux paths, and a resultant error signal is generated and transmitted to the input of amplifier 58 through center tap lead 35. The polarity of the error signal and hence, the direction of rotation of the shaft of motor 54 will depend upon the direction of relative rotation of rotor 17, 18 and stator 26. The sensitivity of the sensing device is sufficient to provide a perceptible error signal as a result of as little as 0.03° of relative rotation of rotor 17 and stator 26.

Means are provided for rotatably driving shaft 16 and hence, the stator assembly 26 relative to rotor 17 and the aircraft frame 10 in response to the error signal supplied to amplifier 58 when said rotor is displaced from its null position to thereby cause the stator to follow the rotor until the null relationship is reestablished. For this purpose, gear 41, which is mounted on stator shaft 16, is drivably connected to the shaft of servomotor 54 by a four-pass gear train G. Said motor may be of well known construction comprising a fixed phase winding 64 connected to the AC source by leads 65 and 66 through a phase shift capacitor 66'. The control phase winding 67 of the motor is connected to the output of amplifier 58, and the latter is powered by direct current from rectifier means 68 connected across a center tapped secondary winding 69 of transformer 56. The power supply to the amplifier may be regulated by a Zener diode 70.

When an aircraft on which the above-described instrument is mounted changes its angle of attack, the vane 11 and hence, rotor 17 are maintained stationary in space by the air stream while the remainder of the instrument, including the stator 26, rotates relative to the rotor with the aircraft through an angle equal to the change in angle of attack. The resultant error signal generated by the sensing device is transmitted to the amplifier, and the amplified signal is applied to the control phase winding 67 of servomotor 54. The latter, through gear train G and gear 41, rotates outer shaft 16 and hence, stator 26 relative to rotor 17 and the aircraft in a direction to restore the null or zero output relationship of the rotor and stator.

The magnitude of any change in angle of attack is measured by the angular followup movement of the stator 26 and of gear 41 which is directly proportional to the angular movement of the shaft of motor 54 as well as to the movement of gears and shafts driven by the motor. These movements are cumulative for successive changes of angle of attack so that the total angular change from a reference plane or position is indicated, said reference plane being predetermined as mentioned above, by the positioning of dowels 51 and hence by the mounting of the instrument in the craft. If desired, therefore, motor 54 may be connected through gear train G and gear train T to drive a plurality of potentiometers P, synchro transmitters S, and the like for indicating and control purposes. The gears, motor, potentiometers and the like may be supported by spaced plates 71 and 72 mounted on frame or casing 12. Amplifier 58 may also be mounted on plate 72 within a removable cover 73. External electrical connections may be made through a multiple socket connector 74 mounted in said cover.

The gear train T, including gear 41, is of novel construction to obviate errors which might otherwise result from backlash in the meshing gears. As shown, said train comprises two terminal pinions 75 and 76 in constant mesh with gear 41 and a plurality of intermeshing pinions therebetween. The relationship of the pinions is such that pinions 75 and 76 are driven by gear 41 in the same direction. As shown, gear train T is symmetrical about a central pinion 77. Except for pinions 76 and 76', pairs of pinions having a common shaft are connected together for rotation. Pinion 76, however, is freely mounted on a shaft 78 for rotation relative thereto and is drivably connected to gear 76', which is also mounted on shaft 78, by a coil spring 79 disposed around the shaft or a sleeve thereon between the pinions.

The hooked ends of coil spring 79 are connected eccentrically to gears 76 and 76'. The spring is continuously under torsional compression or tension so that said spring ends and hence said gears are urged in opposite directions. Thus, the teeth of gear 76 are continuously urged into driving engagement with teeth on gear 41 in one direction while gear 75 at the opposite end of the gear train T has its teeth urged into driving engagement with teeth on gear 41 in the opposite direction. Accordingly, upon movement of gear 41 in one direction, one of gears 75 and 76 will respond without backlash and upon movement of gear 41 in the opposite direction, the other of said gears 75 and 76 will respond at once. Similarly, teeth on pairs of intermediate meshing gears are maintained in contact for immediate response irrespective of the direction of rotation of gear 41 and of the direction of the drive through train T. Error which would result from backlash in the gear train is thus avoided.

Although only a single embodiment has been illustrated in the drawings, the invention is not limited thereto. The return lead 59 may, for example, be connected to a center tap terminal on secondary winding 55 and, if desired, each half of stator winding 34 at opposite sides of center tap 35 may consist of only one coil or wound portion or of more than the two coils illustrated, one of the criteria being that the center-tapped winding shall function as a normally balanced impedance or center-tapped voltage divider. Similarily, the resistance voltage dividers 61 and 63 together with resistor 60 and capacitor 62 are for adjustment purposes and may be dispensed with when the lead 59 is connected to the center of winding 55.

I claim:

1. In electrical apparatus a bridge circuit comprising power input terminals, an inductive winding in each of two arms of said circuit, said windings being connected in series across said input terminals, a first output terminal between said windings, a first resistance connected across said input terminals and having an adjustable tap connected to a second output terminal and a second resistance connected across said input terminals and having an adjustable tap connected through a capacitor to said second output terminal, a source of AC electrical potential connected across said input terminals, and means for balancing and unbalancing the impedances of said windings to thereby nullify and vary, respectively, the signal output across said output terminals.

2. Electrical apparatus as defined in claim 1, wherein said means simultaneously increases the impedance of one said winding and decreases the impedance of the other said winding.

3. Electrical apparatus as defined in claim 1, wherein said means for varying said impedances includes means for varying the reluctance of the paths for magnetic flux generated by current flow through said windings.

4. Electrical apparatus as defined in claim 1, wherein said means for varying the impedance of each of said windings portion comprises a core of magnetic material for said winding and an element of magnetic material adjacent and movable relative to said core for varying the reluctance of the path for magnetic flux generated by current flow through said winding.

5. Electrical apparatus as defined in claim 15 comprising amplifier means and means connecting the input stage of said amplifier means across the output terminals.

6. Electrical apparatus as defined in claim 5 comprising a servomotor having a control phase winding connected across the output terminals of said amplifier means, and means for energizing the fixed phase winding of said motor.

7. Electrical apparatus as defined in claim 1, wherein said means for varying the impedance of said windings comprises magnetic core means for said windings, a rotor of magnetic material adjacent said core means and angularly movable relative thereto about an axis to vary the reluctance of the magnetic flux paths for said windings.

8. Electrical apparatus as defined in claim 7 comprising means for limiting to a small angle the angular movement of said rotor relative to said core means.

9. Electrical apparatus as defined in claim 7 comprising means mounting said core means for rotation about said rotor axis.

10. Electrical apparatus as defined in claim 7 comprising electrical motor means operable in response to the signal output of said circuit and means for drivably connecting said motor means to said core means.

11. Electrical apparatus as defined in claim 1, comprising a rotatably mounted rotor having an arcuate pole of magnetic material, a rotatably mounted stator of magnetic material having spaced poles interfaced with said rotor pole on each of which a said winding is supported and a third pole therebetween, the arcuate extent of the face of the rotor pole being less than the arc subtended by the faces of said stator poles, and means for limiting rotation of said rotor relative to the stator to a small angle in either direction from a central position wherein the impedances of said windings are balanced with each other.

12. Apparatus as defined in claim 1, wherein the face of said rotor pole subtends an angle approximately equal to the angle between the radii containing the centers of the faces of the stator poles supporting the windings.

13. Electrical apparatus as defined by claim 1 wherein said windings are so wound on the stator poles that magnetic flux generated thereby in said poles is of the same polarity in said third stator pole.

UNITED STATES PATENT OFFICE
CERTIFICATE OF CORRECTION

Patent No. 3,593,337          Dated July 13, 1971

Inventor(s) Victor D. Ellison

It is certified that error appears in the above-identified patent and that said Letters Patent are hereby corrected as shown below:

In the ABSTRACT, line 5, "rotatably" should read -- rotatable --. Column 6, lines 8 and 9, cancel "portion"; line 13, the claim reference numeral "15" should read -- 1 --; lines 47 and 51, the claim reference numeral "1", each occurrence, should read -- 11 --.

Signed and sealed this 7th day of March 1972.

(SEAL)
Attest:

EDWARD M.FLETCHER,JR.
Attesting Officer

ROBERT GOTTSCHALK
Commissioner of Patents

UNITED STATES PATENT OFFICE
CERTIFICATE OF CORRECTION

Patent No. 3,593,337      Dated July 13, 1971

Inventor(s) Victor D. Ellison

It is certified that error appears in the above-identified patent and that said Letters Patent are hereby corrected as shown below:

Claim 5, line 1, "15" should read -- 1 --.

Signed and sealed this 20th day of March 1973.

(SEAL)
Attest:

EDWARD M. FLETCHER, JR.       ROBERT GOTTSCHALK
Attesting Officer      Commissioner of Patents